United States Patent Office 3,196,164
Patented July 20, 1965

---

3,196,164
DERIVATIVES OF LACTONES OBTAINED FROM PLANTS OF THE FAMILY COMPOSITAE
Robert Armistead Lucas, Mendham, and Harold Belding MacPhillamy, Madison, N.J., assignors to Ciba Corporation, New York, N.Y., a corporation of Delaware
No Drawing. Filed Jan. 18, 1963, Ser. No. 252,318
6 Claims. (Cl. 260—343.3)

The present invention relates to a new compound hereinafter identified as the dihydro-compound of Su-12334; this compound has analgesic properties and can be used accordingly to alleviate pain. It may also be used as an intermediate for the manufacture of other useful compounds.

The compound identified as Su-12334 is isolated from the plant material of plants of the family Compositae, particularly from plant material of plants of the genus Helenium, such as *Helenium amarum* or other related species according to the procedure described in our copending patent application Serial No. 252,392, concurrently filed herewith. Su-12334 has the structure of the formula

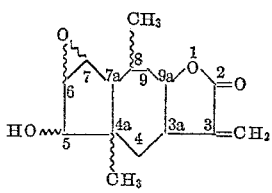

and is further identified hereinbelow.

The compound of this invention differs from Su-12334 by having two additional hydrogen atoms; it has the structure of the formula

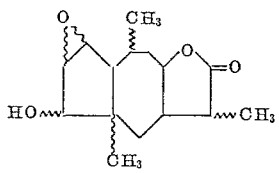

i.e. is 5-hydroxy-6,7-oxido-2-oxo-3,4a,8-trimethyl-2,3,3a, 4,4a,5,6,7,7a,8,9,9a - dodecahydro - azuleno[6,5-b]furan. A sample of this compound, recrystallized from ethyl acetate, melts at 223–225°; its specific rotation is $[\alpha]_D^{26} = 22.7°$ (in chloroform), and analyzes as follows: calcd. for $C_{15}H_{22}O_4$ (266.33)—C, 67.64; H, 8.33; found—C, 67.08; H, 8.29. Its infrared absorption spectrum taken in chloroform and expressed in cm.$^{-1}$ shows the following bands: strong bands at 1762 and 993; medium bands at 2935 (broad) and 1112; weak bands at 3625 (broad), 2980 (broad), 1455, 1383, 1165 (broad), 1047 and 841; shoulders at 973 and 950. The following data are taken from the nuclear magnetic resonance absorption curve of the dihydro-compound of Su-12334 (recrystallized from ethyl acetate), produced on an analytical NMR A60 spectrometer, using a solution of 0.02 g. of the crystalline dihydro-compound of Su-12334 in 0.2 ml. of deuterated chloroform, and tetramethylsilane (TMS) as the internal reference expressed as $\delta = 0$ p.p.m. (parts per million): hydrogens of methyl group at 3-position: doublet with $\delta = 1.21$ p.p.m. and $J = 5.3$ c.p.s. (cycles per second); hydrogens of methyl at 4a-position: singlet with $\delta = 1.12$ p.p.m.; hydrogen at 5-position: doublet (which upon deuteration changes to a singlet) with $\delta = 3.72$ p.p.m. and $J = 5.2$ c.p.s.; hydrogen of hydroxyl at 5-position: doublet (which upon deuteration disappears) with $\delta = 2.42$ p.p.m. and $J = 5.2$ c.p.s.; hydrogen at 6-position+hydrogen at 7-position: collapsed AB-quartet with $\delta = 3.35$ p.p.m. and $J \sim 3.8$ c.p.s.; hydrogens of methyl at 8-position: doublet with $\delta = 1.16$ p.p.m. and $J = 5.5$ c.p.s.; and hydrogen at 9a-position: triplet (+additional splitting) with $\delta = 4.25$ p.p.m. and $J \sim 10.0$ c.p.s.

The compound of this invention is prepared by reducing in Su-12334 the carbon-carbon double bond.

The above reduction is carried out according to known methods for example by treatment of the starting material with a suitable light metal hydride reducing reagent, such as an alkali metal borohydride e.g. sodium borohydride and the like, usually in the presence of an appropriate solvent, such as a lower alkanol, e.g. methanol and the like. Other reducing methods suitable for the removal of the carbon-carbon double bond in the starting material include treatment with hydrogen activated by the presence of a metal catalyst, such as palladium catalyst and the like, and of a diluent, with nascent hydrogen as generated by reacting a metal or a metal amalgam with a suitable hydrogen donor, by electro-chemical reduction methods and the like.

Also included within the scope of this invention are the O-acyl-compounds of the dihydro-compound of Su-12334 having the structure of the formula

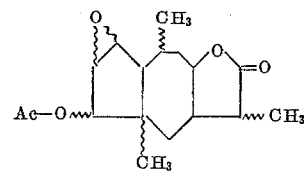

in which Ac is the acyl group of an organic acid, having preferably from one to twenty carbon atoms, particularly of an organic carboxylic acid, as well as an organic sulfonic acid.

The acyl group, represented by Ac in the above formula, is, for example, the acyl radical of an aliphatic carboxylic acid, particularly of a lower alkanoic acid, e.g. acetic, propionic, butyric, pivalic, 2,2-dimethyl-butyric acid and the like, as well as a cycloalkane carboxylic acid, in which cycloalkane has from five to seven ring carbon atoms, e.g. hexahydrobenzoic acid and the like, a cycloalkyl-lower alkanoic acid, in which cycloalkyl has from three to seven, particularly from five to seven, ring carbon atoms, e.g. cyclohexylacetic, β-cyclopentylpropionic acid and the like; acyl may also be the acyl radical of a carbocyclic aryl carboxylic acid, such as benzoic, a (lower alkoxyl)-benzoic acid, e.g. 3,4,5-trimethoxybenzoic acid and the like, of a carbocyclic aryl-aliphatic carboxylic acid, e.g. cinnamic, 3,4,5-trimethoxy-cinnamic acid and the like, a heterocyclic aryl carboxylic acid, e.g. nicotinic, isonicotinic acid and the like, or any other suitable organic carboxylic acid. The acyl group may also stand for the acyl radical of an organic sulfonic acid, e.g. methane sulfonic, ethane sulfonic, benzene sulfonic, p-toluene sulfonic acid and the like.

The O-acyl-compounds of the dihydro-compound of Su-12334 are prepared by converting in the dihydro-compound of Su-12334 the free hydroxyl group into an acyloxy group.

The acylation reaction is carried out according to known methods, for example, by treating the dihydro-compound of Su-12334 with an organic acid halide, e.g. chloride and the like, such as an organic carboxylic acid halide, for example, a lower alkanoic acid halide, e.g. acetyl chloride, propionic acid chloride, pivalic acid chloride and the like, as well as an organic sulfonic acid halide, e.g. chloride and the like, such as a carbocyclic aryl sulfonic acid halide, e.g. p-toluene sulfonic acid chloride and the like, or an aliphatic sulfonic acid halide, e.g. methane sulfonic acid chloride and the like. Preferably the acylation reaction with an organic acid halide is carried out in the presence of a suitable base, e.g. pyridine and the like. It may also be performed by treating the starting material with an organic acid anhydride, such as an organic carboxylic acid anhydride, for example, a lower alkanoic acid anhydride, e.g. acetic acid anhydride, propionic acid anhydride and the like, also preferably in the presence of a base, e.g. pyridine and the like. The esters with organic acids may also be obtained by treatment of the starting material with a ketene compound, e.g. ketene, or a substituted ketene.

The O-acyl-compounds of the dihydro-compound of Su-12334, such as those, in which acyl is the radical of an organic carboxylic acid, particularly the O-lower alkanoyl-compounds of the dihydro-compound of Su-12334, also have analgesic properties and can be used accordingly to alleviate pain. Furthermore, they are useful as intermediates, for example, in the characterization and purification of the dihydro-compound of Su-12334; for example, in order to obtain the latter in a very pure state, it may be converted into one of the O-acyl compounds which may then be purified separately and reconverted into the free dihydro-compound of Su-12334 by hydrolysis, for example, by treatment with a suitable base.

Furthermore, the scope of this invention also includes the (deoxy-oxo)-dihydro-compound of Su-12334. It differs from the dihydro-compound of Su-12334 by having the free hydroxyl group replaced by an oxo group, and has the structure of the formula

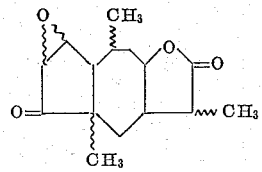

i.e. is 2,5-dioxo-6,7-oxido-3,4a,8-trimethyl-2,3,3a,4,4a,5,6,7,7a,8,9,9a-dodecahydro-azuleno[6,5-b]furan.

A sample of this compound recrystallized from a mixture of ethyl acetate and methylene chloride, melts at 238–240°, its specific rotation in chloroform is $$[\alpha]_D^{26} = +116.4°$$

it analyzes as follows: calcd. for $C_{15}H_{20}O_4$ (264.31)—C, 68.16; H, 7.63; found—C, 68.70; H, 7.59. Its infrared absorption spectrum taken in chloroform and expressed in cm.$^{-1}$ shows the following bands: strong bands at 1768, and 1002; medium bands at 2948 (broad), 1462, 1392, 1177 and 850; weak bands at 2982, 1342, 1329, 1133, 1113, 977 and 953; shoulders at 2892 and 1760. The following data are taken from the nuclear magnetic resonance absorption curve of the (deoxy-oxo)-dihydro-compound of Su-12334 (recrystallized from a mixture of ethyl acetate and methylene chloride), produced on an analytical NMR A60 spectrometer, using a solution of 0.02 g. of the crystalline (deoxy-oxo)-dihydro-compound of Su-12334 in 0.2 ml. of deuterated chloroform, and tetramethylsilane (TMS) as the internal reference expressed as $\delta = 0$ p.p.m.: hydrogens of methyl at 3-position: doublet with $\delta = 1.28$ p.p.m. and $J = 5.2$ c.p.s.; hydrogens of methyl group at 4a-position: singlet with $\delta = 1.18$ p.p.m.; hydrogen at 6-position: doublet with $\delta = 3.70$ p.p.m. and $J = 2.5$ c.p.s.; hydrogen at 7-position: doublet with $\delta = 3.58$ p.p.m. and $J = 2.5$ c.p.s.; hydrogens of methyl group at 8-position: doublet with $\delta = 1.25$ p.p.m. and $J \sim 6.0$ c.p.s.; and hydrogen at 9a-position: triplet (with additional splitting) with $\delta = 4.33$ p.p.m. and $J \sim 10.0$ c.p.s.

This compound has analgesic properties and can be used accordingly to alleviate pain.

The (deoxy-oxo)-dihydro-compound of Su-12334 may be prepared by treating the dihydro-compound of Su-12334 with an oxidation reagent capable of converting a hydroxyl group into an oxo group.

The above reaction is carried out according to known methods. We prefer to convert the hydroxyl group of the starting material into an oxo group by treatment with a suitable inorganic oxidizing reagent, particularly an oxidizing reagent containing hexavalent chromium capable of generating chromic acid, such as chromium trioxide or a dichromate salt, e.g. ammonium dichromate, sodium dichromate and the like; these reagents are used in the presence of an acid, e.g. sulfuric acid, acetic acid and the like. Chromium trioxide may also be used in the form of its complex with pyridine. The oxidation reaction with a reagent containing hexavalent chromium is carried out in the presence of a suitable diluent, e.g. acetone and the like, if necessary, while cooling or heating. Other oxidation reagents capable of converting a hydroxyl group into an oxo group are, for example, ketones, such as lower alkanoes, e.g. acetone and the like, in the presence of metallic alkanolates, such as aluminum lower alkanolates, e.g. aluminum tertiary butanolate and the like, used according to the Oppenauer oxidation reaction, or any other suitable oxidation reagent or method.

The new compounds of this invention having analgesic properties may be used in the form of compositions for enteral or parenteral use, which contain the new compounds in admixture with an organic or inorganic, solid or liquid carrier. For making up the separations there may be employed substances which do not react with the new compounds, such as water, gelatine, lactose, starches, stearic acid, magnesium stearate, talc, vegetable oils, benzyl alcohol, stearyl alcohol, gums, tragacanth, polyalkylene glycols or any other known carrier for pharmaceutical preparations. The latter may be in solid form, for example, as capsules, tablets, dragees, suppositories and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, solubilizers etc. They may also contain, in combination, other useful substances.

The following examples are intended to illustrate the invention and are not to be construed as being limitations thereon. Temperatures are given in degrees centigrade.

*Example 1*

To a solution of 0.2 g. of sodium borohydride in 4 ml. of methanol is added a solution of 0.2 g. of Su-12334 (as prepared according to the procedure described below) in 8 ml. of methanol. After standing for one hour at room temperature, the clear solution is diluted with 80 ml. of ice-water, and is made slightly acidic (pH 4) with concentrated hydrochloric acid. It is then concentrated under reduced pressure at a temperature of 50° until most of the methanol has been driven off, and the aqueous phase is extracted with methylene chloride. The organic extracts are dried over sodium sulfate, filtered and concentrated under reduced pressure. The crystalline residue (0.2 g.), representing the dihydro-compound of Su-12334, having the structure of the formula

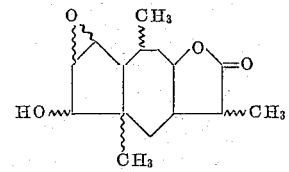

is recrystallized from ethyl acetate, M.P. 223–225°; yield: 0.161 g.

The starting material used in the above example is prepared as follows: A batch of 300 g. of ground plant material, including roots, stems and leaves, is extracted twice with about 800 ml. each of hot methanol, and once with about 800 ml. of hot water; the two extracts are combined and concentrated to a volume of about 100 ml. The resulting solution is extracted with 100 ml. of n-butanol; the organic phase is washed with 50 ml. of water, and the aqueous phase is washed with 50 ml. of n-butanol. The organic washing is washed with the water washing and combined with the original n-butanol phase, and the combined organic solutions are partially evaporated under reduced pressure and then freeze-dried under reduced pressure; weight: 25 g.

The resulting residue is taken up in 100 ml. of hot benzene; the insoluble material is filtered off (weight: 10 g.) and extracted with another 100 ml. of hot benzene. The insoluble material is discarded (weight: 4.9 g.), and the two remaining benzene solutions are individually concentrated to a volume of about 50 ml.; the insoluble material (1.3 g. from the first benzene extraction and 3.7 g. of the second benzene extraction) is filtered off, and the two filtrates are combined and taken to dryness; weight: 15 g.

A solution of the benzene-soluble material in benzene is placed onto a column containing 450 g. of aluminum oxide (Woelm, neutral, Grade II–III) and eluted as follows:

| Fractions | Solvent | Amount (in ml.) | Yield (in g.) | State |
|---|---|---|---|---|
| 1 | Benzene | 400 | 0.88 | Oily. |
| 2 | do | 400 | 0.26 | Do. |
| 3 | do | 400 | 0.35 | Semi-solid. |
| 4 | do | 400 | 0.26 | Cryst. |
| 5 | do | 400 | 0.18 | Do. |
| 6 | do | 400 | 0.23 | Do. |
| 7 | do | 400 | 0.14 | Do. |
| 8 | do | 400 | 0.055 | Do. |
| 9 | 1:1-mixture of benzene and methylene chloride. | 400 | 0.045 | Do. |
| 10 | do | 400 | 0.055 | Do. |
| 11 | Methylene chloride | 400 | 0.09 | Oily. |
| 12 | do | 400 | 0.26 | Do. |
| 13 | do | 800 | 0.42 | Do. |
| 14 | do | 400 | 0.19 | Do. |
| 15 | do | 1,600 | 0.95 | Cryst. |
| 16 | do | 1,600 | 0.45 | Do. |
| 17 | do | 800 | 0.05 | Do. |
| 18 | Methylene chloride containing 1 percent methanol. | 800 | 0.32 | Do. |
| 19 | do | 800 | 0.09 | Do. |
| 20 | Methanol | 700 | 0.77 | Frothy. |

Fractions 15 to 17 are combined and evaporated to dryness under reduced pressure, and the residue is crystallized from diethyl ether; the semi-crystalline material, M.P. 189–194° (weight: 0.19 g.) is recrystallized from benzene to yield the pure Su–12334, which melts at 197–198°.

The compound Su–12334 is composed exclusively of carbon, hydrogen and oxygen and analyzes as follows:

| Sample | Carbon (percent) | Hydrogen (percent) | Melting point, deg.[1] | $[\alpha]_D^{25}$, deg.[2] |
|---|---|---|---|---|
| Sublimed | 67.98 | 7.64 | 185–186 | |
| Recrystallized from benzene | 68.71 | 7.85 | 197–198 | +3.4 |
| Recrystallized from ethyl acetate | 67.73 | 7.65 | 197–198 | +6.9 |
| Recrystallized | 68.48 | 7.40 | 197–198 | |

[1] Taken in open capillary tube, uncorrected.
[2] Taken in chloroform.

The molecular weight of Su–12334 as determined by mass spectroscopy using the analytical sample recrystallized from benzene, is 264, and as determined on the same sample by single crystal X-ray diffraction is 268 (±2 percent), and its empirical formula $C_{15}H_{20}O_4$. The crystalline system of the benzene recrystallized material is monoclinic; the space group is $P2_1$; the number of asymmetric units per unit cell is Z=2; and the unit cell dimensions are as follows: $a$=10.02 A.; $b$=6.73 A.; $c$=10.42 A.; and $\beta$=99°.

Su–12334 absorbs the ultraviolet light only in the end absorption region; the infrared absorption spectrum of the sublimed analytical sample taken in chloroform and expressed in cm.$^{-1}$ shows the following bands: strong bands at 1756 (broad), 990, 940 and 840; medium bands at 3630, 3489, 1460, 1410, 1385, 1330, 1160 and 1120; weak bands at 1663, 1090, 1070 and 875; and shoulders at 1630, 1470, 1310, 1260, 1050, 995, and 900.

The $R_f$-value of the sample of Su–12334 recrystallized from benzene as determined on paper (Whatman No. 1), impregnated with a 1:1-mixture of formamide (adjusted to pH 5.6 with benzoic acid) and methanol, and using as the mobile phase a 1:1-mixture of xylene and methyl ethyl ketone, is 0.35 to 0.5.

The compound Su–12334 shows the following solubility pattern: very soluble in chloroform and methylene chloride, soluble in benzene, ethyl acetate and pyridine, fairly soluble in methanol, sparingly soluble in diethyl ether and water, and virtually insoluble in hexane or petroleum ether.

Taking into account all the data obtained from the various physicochemical measurements, particularly from the nuclear magnetic resonance spectrum, Su–12334 has the structure of the following formula

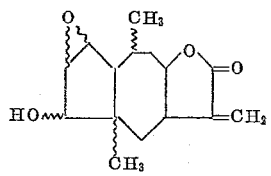

i.e. Su–12334 is 5-hydroxy-4a,8-dimethyl-3-methylene-6,7-oxido - 2 - oxo - 2,3,3a,4,4a,5,6,7,7a,8,9,9a - dodecahydro-azuleno[6,5-b]-furan, with a theoretical molecular weight of 264.31.

The following data are taken from the nuclear magnetic resonance absorption curve of Su–12334 (sublimed sample), produced on an analytical NMR A60 spectrometer, using a solution of 0.02 g. of the crystalline Su–12334 in 0.2 ml. of deuterated chloroform, and tetramethylsilane (TMS) as the internal reference expressed as $\delta$=0 p.p.m. (parts per million): hydrogens of methylene group at 3-position: doublet with $\delta$=5.43 p.p.m. and J=3.1 c.p.s. (cycles per second), and doublet with $\delta$=6.15 p.p.m. and J=3.3; hydrogens of methyl group at 4a-position: singlet with $\delta$=1.13 p.p.m.; hydrogen of hydroxyl group at 5-position: doublet with $\delta$=2.57 p.p.m. and J=5.3 c.p.s. (disappears after deuteration); hydrogen at 5-position: doublet with $\delta$=3.75 p.p.m. and J=5.4 c.p.s. (disappears after deuteration); hydrogens at 6-position and 7-position: doublet+doublet with $\delta$=3.38 p.p.m. and J less than 1 c.p.s.; hydrogens of methyl group at 8-position: doublet with $\delta$=1.23 p.p.m. and J=5.4 c.p.s.; and hydrogen at 9a-position: triplet+doublet with $\delta$=4.30 p.p.m. and J for triplet~10 c.p.s.

*Example 2*

A solution of 0.05 g. of the dihydro-compound of Su–11334 in 0.3 ml. of pyridine and 0.2 ml. of acetic acid anhydride is added. After standing at room temperature over night, the colorless solution is diluted with 5 ml. of ice-water; the separating oil crystallizes upon scratching, is filtered and washed with water and dried (yield: 0.038 g.). The resulting O-acetyl-compound of the dihydro-compound of Su–12334, having the structure of the formula $$\text{H}_3\text{C}-\overset{\text{O}}{\underset{\|}{\text{C}}}-\text{O} \cdots \qquad \cdots \text{CH}_3$$

is recrystallized from water and methanol, M.P. 133–135°; $[\alpha]_D^{26}$=12° (in chloroform); and analyzes as follows: calcd. for $C_{17}H_{24}O_5$ (308.36)—C, 66.21; H, 7.85; found—C, 66.76; H, 7.77.

Other O-acyl-compounds of the dihydro-compound of Su–12334, such as the O-propionyl-compound of the dihydro-compound of Su–12334, the O-pivalyl-compound of the dihydro-compound of Su–12334, the O-benzoyl-compound of the dihydro-compound of Su–12334, the O-nicotinoyl-compound of the dihydro-compound of Su–12334, the O-methylsulfonyl-compound of the dihydro-compound of Su–12334 and the like, having the structure of the following formula

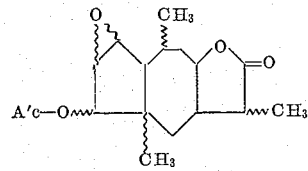

in which Ac' is propionyl, pivalyl, benzoyl, nictotinoyl and methylsulfonyl, respectively, are prepared according to the previously described acylation methods.

Example 3

A solution of 0.1 g. of the dihydro-compound of Su–12334 in 4 ml. of acetone is cooled to 5°, and, while stirring with a magnetic stirrer and maintaining that temperature, 5 drops of Kiliani reagent (prepared by adding slowly 23 ml. of concentrated sulfuric acid to a solution of 26.7 g. of chromium trioxide in 40 ml. of water while cooling and bringing the volume to a total of 100 ml.) are slowly added. A green tar of chromous salts precipitates, while the clear supernatant solution has an orange color; the latter persists after one minute of stirring. The reaction mixture is diluted with 40 ml. of ice-water whereupon a white precipitate forms. The organic material is extracted with methylene chloride, the organic phase is separated, dried over sodium sulfate, filtered and concentrated under reduced pressure. The residue representing the desired (deoxy-oxo)-dihydro-compound of Su–12334, having the structure of the formula

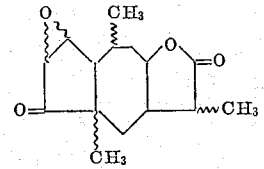

is recrystallized three times from a mixture of ethyl acetate and methylene chloride, M.P. 238–240°; yield: 0.055 g.

What is claimed is:
1. The dihydro-compound of Su–12334, which has the structure of the following formula

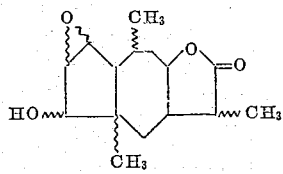

and which differs from the compound identified as Su–12334 by two additional hydrogen atoms, Su–12334 being composed entirely of carbon, hydrogen and oxygen, and having the empirical formula $C_{15}H_{20}O_4$, its sublimed form analyzing for 67.98 percent of carbon and 7.64 percent of hydrogen, melting at 185–186°, and its infrared absorption spectrum, taken in chloroform, showing the following bands expressed in cm.$^{-1}$: strong bands at 1756, 990, 940 and 840; medium bands at 3630, 3490, 1460, 1410, 1385, 1330, 1160 and 1120; weak bands at 1663, 1090, 1070 and 875; and shoulders at 1630, 1470, 1310, 1260, 1050, 995 and 900, and its benzene-recrystallized form melting at 197–198°, having a specific rotation in chloroform of $[\alpha]_D^{25}=+3.4°$, analyzing for 68.71 percent of carbon and 7.85 percent of hydrogen, having a molecular weight of 264 as determined by mass spectroscopy and of 268 ($\pm 2$ percent) as determined by single crystal X-ray having a monoclinic crystalline system with the space group P2$_1$, the number of asymmetric units per unit cell Z=2, and the unit cell dimensions $a=10.02$ A.; $b=6.73$ A.; $c=10.42$ A.; and $\beta=99°$; and having an $R_f=0.35$—0.5 on Whatman No. 1 paper impregnated with a 1:1-mixture of formamide adjusted to pH 5.6 with benzoic acid, and methanol, and a mobile phase consisting of a 1:1-mixture of xylene and methyl ethyl ketone, and being very soluble in chloroform and methylene chloride, soluble in benzene, ethyl acetate and pyridine, fairly soluble in methanol, sparingly soluble in water, and virtually insoluble in hexane and petroleum ether, and having the structure of the following formula

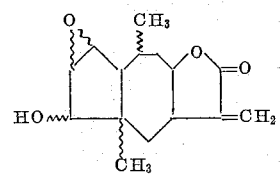

with a theoretical molecular weight of 264.31.

2. The O-acyl-compound of the dihydro-compound of Su–12334, which has the structure of the formula

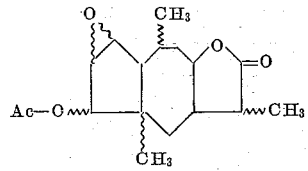

in which Ac is the acyl radical of an organic acid selected from the group consisting of an aliphatic carboxylic acid, a carbocyclic aryl carboxylic acid, a carbocyclic aryl-aliphatic carboxylic acid, a heterocyclic aryl carboxylic acid, an aliphatic sulfonic acid and a carbocyclic aryl sulfonic acid, and in which the compound identified as the dihydro-compound of Su–12334 is characterized in claim 1.

3. The O-acyl-compound of the dihydro-compound of Su–12334, in which the compound identified as the dihydro-compound of Su–12334 is characterized in claim 1, and in which acyl is the radical of an unsubstituted hydrocarbon carboxylic acid having from two to twelve carbon atoms.

4. The O-lower alkanoyl-compound of the dihydro-compound of Su–12334, in which the compound identified as the dihydro-compound of Su–12334 is characterized in claim 1.

5. The O-acetyl-compound of the dihydro-compound of Su–12334, in which the compound identified as the dihydro-compound of Su–12334 is characterized in claim 1.

6. The (deoxy-oxo)-dihydro-compound of Su–12334, which has the structure of the formula

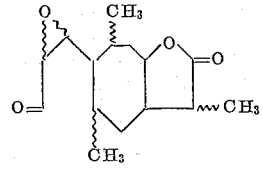

and in which the compound identified as the dihydro-compound of Su–12334 has the characteristics given in claim 1.

References Cited by the Examiner

Barton et al.: Chem. Abstracts, vol. 56 (1962), page 7365.

Herz et al.: Jour. Amer. Chem. Soc., vol. 82 (1960), pages 2276–8.

WALTER A. MODANCE, *Primary Examiner.*